(12) United States Patent
Petrek et al.

(10) Patent No.: US 6,746,064 B1
(45) Date of Patent: Jun. 8, 2004

(54) COMPOSITE WHEEL FOR TRACKED VEHICLES

(75) Inventors: Frank P. Petrek, West Chester, OH (US); Steven J. Shaffer, Columbus, OH (US)

(73) Assignee: Xtek. Inc., Cincinnati, OH (US)

( * ) Notice: Subject to any disclaimer, the term of this patent is extended or adjusted under 35 U.S.C. 154(b) by 0 days.

(21) Appl. No.: 10/288,884

(22) Filed: Nov. 6, 2002

Related U.S. Application Data
(60) Provisional application No. 60/347,845, filed on Nov. 7, 2001.

(51) Int. Cl.[7] .............................................. B60B 17/00
(52) U.S. Cl. ....................... 295/1; 29/894.01; 295/23; 148/583
(58) Field of Search ................. 295/31.1, 1, 8, 295/15, 17, 11; 29/894.01, 894, 527.2, 557; 118/608, 232, 244; 427/456, 576, 239, 194; 219/73.11, 76.14, 76.16, 121.59, 121.47; 148/583, 320

(56) References Cited

U.S. PATENT DOCUMENTS

| | | | |
|---|---|---|---|
| 261,183 A | * 7/1882 | Torre | 295/8 |
| 397,927 A | 2/1889 | Melaney | |
| 547,096 A | 10/1895 | Taylor | |
| 560,161 A | 5/1896 | Harvey | |
| 1,007,942 A | * 11/1911 | Hansen | 72/356 |
| 1,519,029 A | * 12/1924 | Gollwitzer | 29/894.01 |
| 2,030,243 A | 2/1936 | Corts | |
| 2,190,125 A | 2/1940 | Sembdner | |
| 3,107,115 A | * 10/1963 | Kastner | 295/31.1 |
| 3,272,550 A | 9/1966 | Peterson | |
| 3,798,078 A | * 3/1974 | Lettner et al. | 75/253 |
| 4,310,191 A | * 1/1982 | Halldin | 295/31.1 |
| 4,638,540 A | * 1/1987 | Hassellof et al. | 29/894.011 |
| 4,680,846 A | * 7/1987 | Feldewert | 29/894.01 |
| 4,895,408 A | * 1/1990 | Wiebe | 295/34 |
| 5,213,907 A | * 5/1993 | Caballero | 428/678 |
| 5,496,391 A | * 3/1996 | Noel | 75/255 |
| 5,747,163 A | * 5/1998 | Douglas | 428/404 |
| 5,935,350 A | * 8/1999 | Raghu et al. | 148/427 |
| 6,033,001 A | * 3/2000 | Fujimura et al. | 295/21 |
| 6,073,346 A | 6/2000 | Runkle | |

FOREIGN PATENT DOCUMENTS

DE      34 17 903 A1  *  1/1985

\* cited by examiner

Primary Examiner—Frantz F. Jules
(74) Attorney, Agent, or Firm—Thompson Hine LLP

(57) ABSTRACT

The present invention relates to a method of manufacturing an all metal, single or dual, flanged composite railroad wheel for rollingly engaging a metal rail. A unitary metal railroad wheel having at least one radially extending wheel flange, for intermittently engaging the side surface of the rail, is provided with a metallic inlaid material having a coefficient of friction lower than the coefficient of friction of the wheel's main body. The inlaid low friction material forms an annular band circumscribing the inside surface of the wheel's radially extending flange.

25 Claims, 5 Drawing Sheets

COMPOSITE WHEEL FOR TRACKED VEHICLES

RELATED APPLICATIONS

This application claims the priority of Provisional Patent Application serial No. 60/347,845 filed on Nov. 7, 2001 now abandoned titled "Composite Wheel For Tracked Vehicles".

BACKGROUND OF THE INVENTION

The present invention generally relates to a flanged steel wheel having either single or dual flanges as typically used on tracked transportation vehicles such as railway locomotives and rolling stock, shipyard and port gantry cranes, industrial bridge cranes, mining cars transit cars or any other material handling or transportation application. More specifically the present invention relates to an improved composite structure for the flanged portion of both single and dual flanged wheels.

Although the present invention is equally applicable to single flanged steel wheels, it is particularly useful on dual flanged steel wheels typically used in industrial gantry and bridge cranes that traverse fixed, parallel rails, of finite length. In such industrial applications, because of the typical asymmetrical loading of the gantry or bridge crane, the vertical plane of the flanged wheel frequently becomes askew to the direction of the rails whereby the wheel flange contacts the side of the rail causing frictional erosion of the flange thickness. As a result of such flange erosion, the flange thickness is progressively diminished whereby the wheel flange may fail causing possible derailment of the tracked vehicle.

Heretofore attempts have been made to solve the wheel flange erosion problem by manufacturing the wheels from hardened steel whereby the wheel flange could withstand the lateral forces applied to it resulting from flange-rail contact and in an attempt to slow the rate of frictional erosion of the flange. Another solution has been to reduce the frictional forces between rail and wheel flange by application of a lubricant to the wheel flange, or to the side of the rail, without the lubricant finding its way to the to the top of the rail or to the wheels' tread surface.

Either method has its own unique maintenance requirements. The hardened steel wheel must be frequently inspected for frictional erosion upon the wheel flange so that the wheel may be replaced before the wheel flange fails. The rail and/or wheel flange lubrication method requires inspection and maintenance to keep the lubrication supply replenished and requires proper alignment and maintenance of the lubrication dispensing system to assure that the lubricant is not applied to the top of the rail or the wheel tread surface whereby desired frictional contact, between rail and wheel tread is sacrificed.

Prior Art

The prior art has long recognized the diverse property requirements between the wheel tread and wheel flange for steel wheels operating on a steel rail, particularly where the wheel is a driving wheel. The tread requiring high traction, or a high coefficient of friction, and the flange requiring high strength and a low coefficient of friction. Therefore, manufacturing the wheel from a unitary base material is not necessarily desirable. To solve the diverse material property problem, between the wheel flange and wheel tread, the prior art devised mechanical techniques whereby the wheel body, tread and flange comprise different materials as evidenced by the following prior art patents:

U.S. Pat. No. 307,927 teaches a composite wheel having a cast iron facing circumscribing the tread area of the wheel and extending radially outward to cover the inside surface of the wheel flange.

U.S. Pat. No. 547,096 teaches a main body, including the wheel flange, manufactured from cast iron and having a forged or rolled steel hoop inserted into the main body forming the tread area of the wheel.

U.S. Pat. No. 560,161 teaches a wheel having a variable distribution of carbon comprising a tough metal substrate, such as low-carbon steel, and having an external stratum comprising the wheel tread which is composed of a relatively high-carbon steel. The inside surface of the flange, adjacent the wheel tread, is disclosed as "somewhat less hard."

U.S. Pat. No. 2,030,243 teaches a composite wheel having a main body substrate wherein there are two circumscribing bands of differing materials. One band includes the inside half of the wheel flange and one half of the tread. The second band forms the remaining half of the wheel tread. The first band comprises a high resistance material and the second band is made of a softer material.

U.S. Pat. No. 3,272,550 teaches a composite wheel structure wherein the wheel flange and the main body of the wheel are of the same material. An "annular outer skin," having a modulus of elasticity lower than that of the rail circumscribes the tread area of the wheel.

U.S. Pat. No. 4,310,191 teaches a composite wheel wherein the main body of the wheel includes the wheel flange, and a rim of high friction material circumscribes the tread area of the wheel.

U.S. Pat. No. 4,638,540 teaches a composite wheel having a main body substrate material having separate inlaid materials for the wheel tread and the inside surface of the wheel flange.

U.S. Pat. No. 6,073,346 teaches a wheel having a main body substrate material, including the outer half of the wheel flange, a circumscribing hoop forming the wheel tread and inside half of the wheel flange. It is proposed that the hoop be made of a high frictional material for locomotive wheels and a low frictional material for railroad rolling stock wheels. The hoop forming the tread and inside half of the flange are made from powdered metal, hot isostaticly pressed in place about the wheel substrate.

BRIEF SUMMARY OF THE INVENTION

The present invention provides a method by which the entire flanged railroad wheel may comprise a hardened steel material to adequately withstand the operating loads and forces typically acting upon such a wheel when in service. However, an overlay of metallic material is applied to the inside surface of the wheel's flange thereby forming an annular band of low friction material circumscribing the inside surface of the wheel flange. The annular band of overlaid, low friction material is positioned in the area of the flange that engages the rail's side surface. Typically the overlay material may comprise a cobalt or nickel based alloy, however any other suitable material may be used.

DETAILED DESCRIPTION ON THE INVENTION

Although the following description specifically describes the present invention as being applied to a single flanged wheel typically used on railroad vehicles and/or any other transport vehicle, the invention is to be understood as being equally applicable to dual flanged steel wheels as typically used on rail guided industrial, crane type, vehicles.

Figure 1:
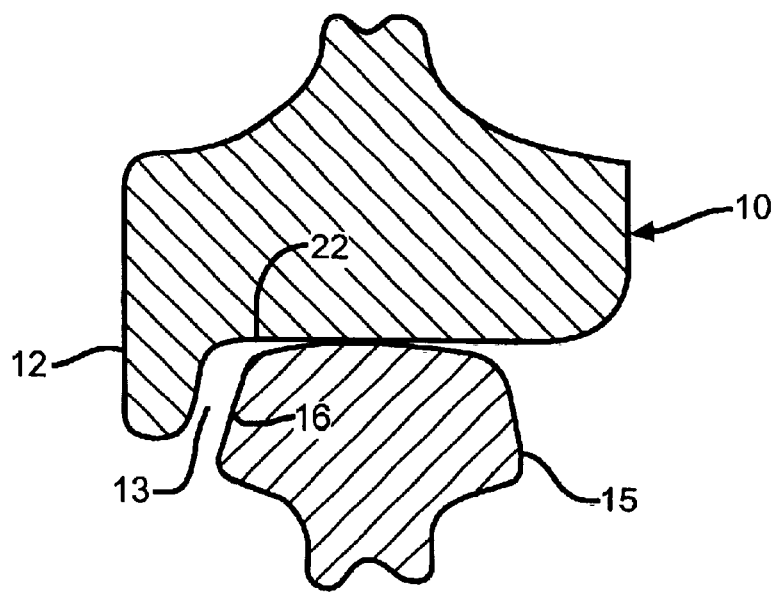
FIG. 1 presents a partial crossectional view of a single flanged, steel wheel in rolling engagement with a supporting rail.

FIG. 1 illustrates a partial crossectional view of a typical dual flanged steel wheel 10, having a single flange 12, in rolling contact with a typical guide rail 15. Under ideal conditions a clearance 13 exists between the wheel flanges 12 and rail 15, whereby rail-wheel contact only exists between the top of the rail 15 and the wheel's tread 22.

Figure 2:
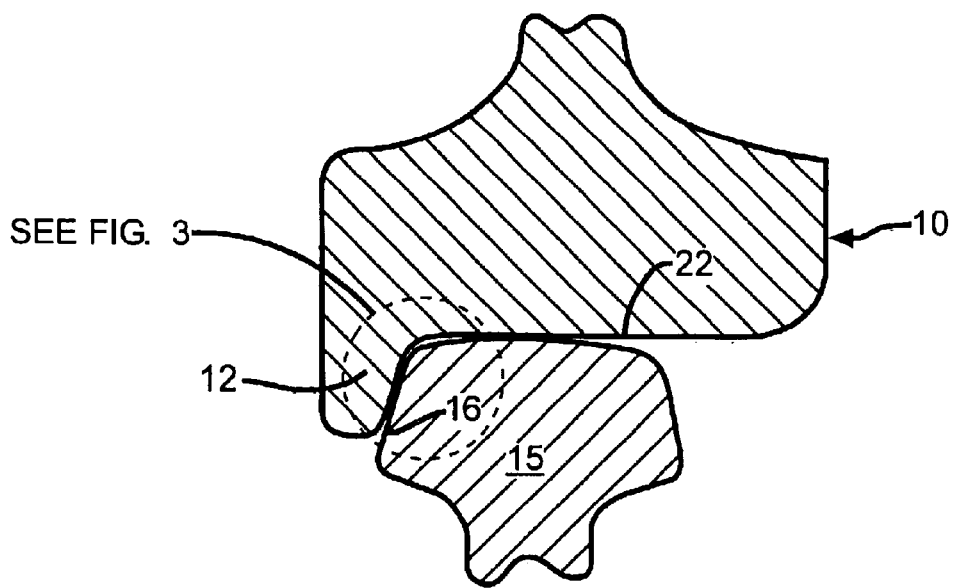
FIG. 2 presents a partial crossectional view, similar to FIG. 1, of a single flanged wheel in rolling engagement with a supporting rail wherein one flange is in frictional contact with the side of the supporting rail.
Figure 3:
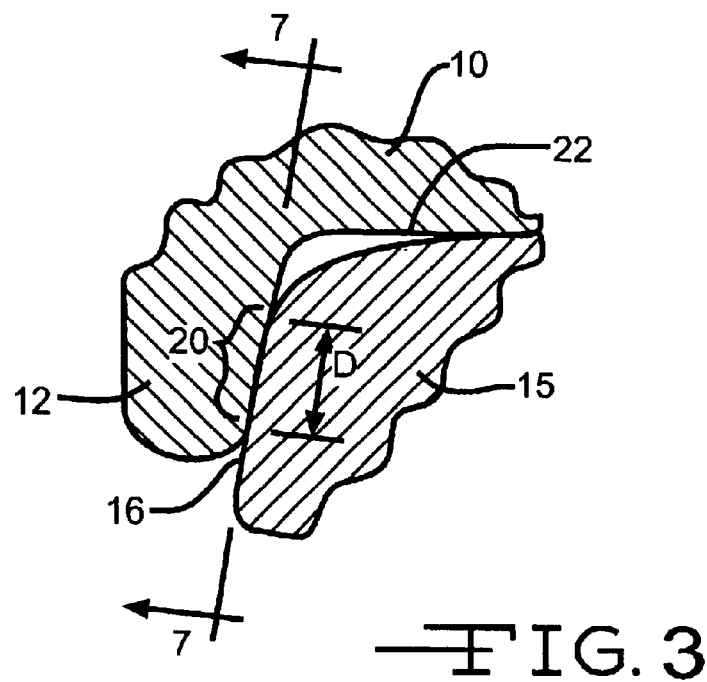
FIG. 3 presents a enlarged view of the circled area in FIG. 2.

However many times, because of asymmetrical loading of the tracked vehicle or defects in rail alignment, the wheel flange may frequently engage the rail side face 16 thereby causing frictional engagement between rail flange 12 and the rail side face 16 as illustrated in FIGS. 2 and 3. Such frictional engagement, between the rail side face 16 and the wheel flange 12 will eventually result in wheel flange erosion and deformation.

Referring to FIG. 3, it is seen that, because of the inside configuration of flange 12 and the external configuration of rail 15, there is surface to surface contact between rail 15 and flange 12 over the radial distance D.

Figure 3A:
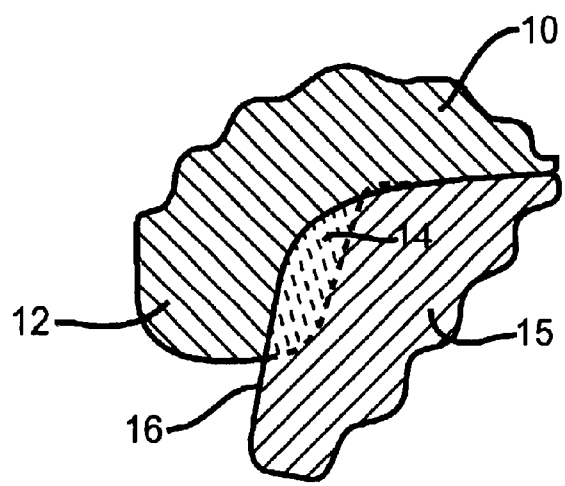
FIG. 3A presents a view, similar to that of FIG. 3, showing structural mass loss of a wheel flange having been eroded by flange-rail contact.
Figure 7:
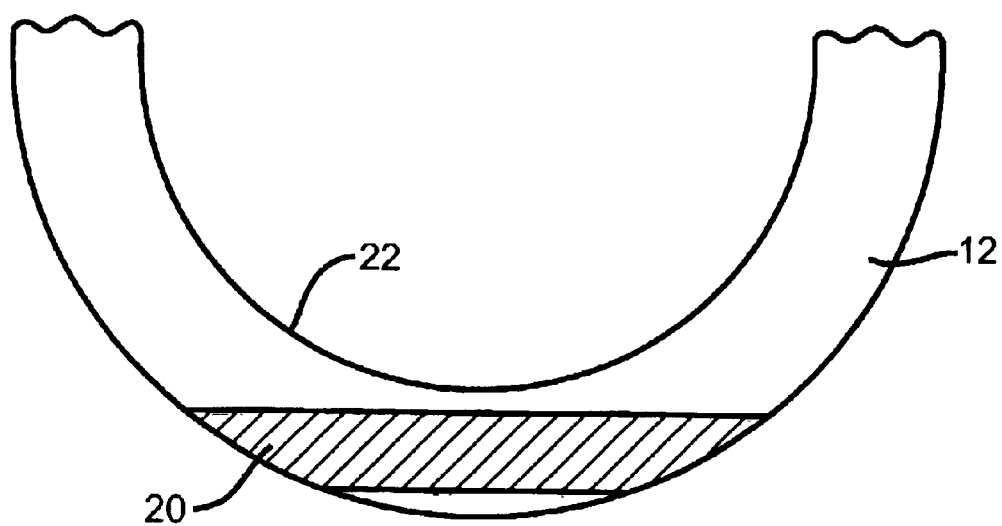
FIG. 7 presents a view taken along line 7—7 in FIG. 3 showing the area of contact between flange and rail.

Thus a generally rectangular frictional area 20 exists between the rail side face 16 and the inside surface of flange 12, as illustrated in FIG. 7, over which flange wear will occur causing loss of flange structural mass. FIG. 3A depicts excessive flange erosion wherein a substantial portion 14 of the flange structural mass has been eroded away through frictional engagement of flange 12 with rail 15, thereby weakening the structural integrity of flange 12.

Figure 4:
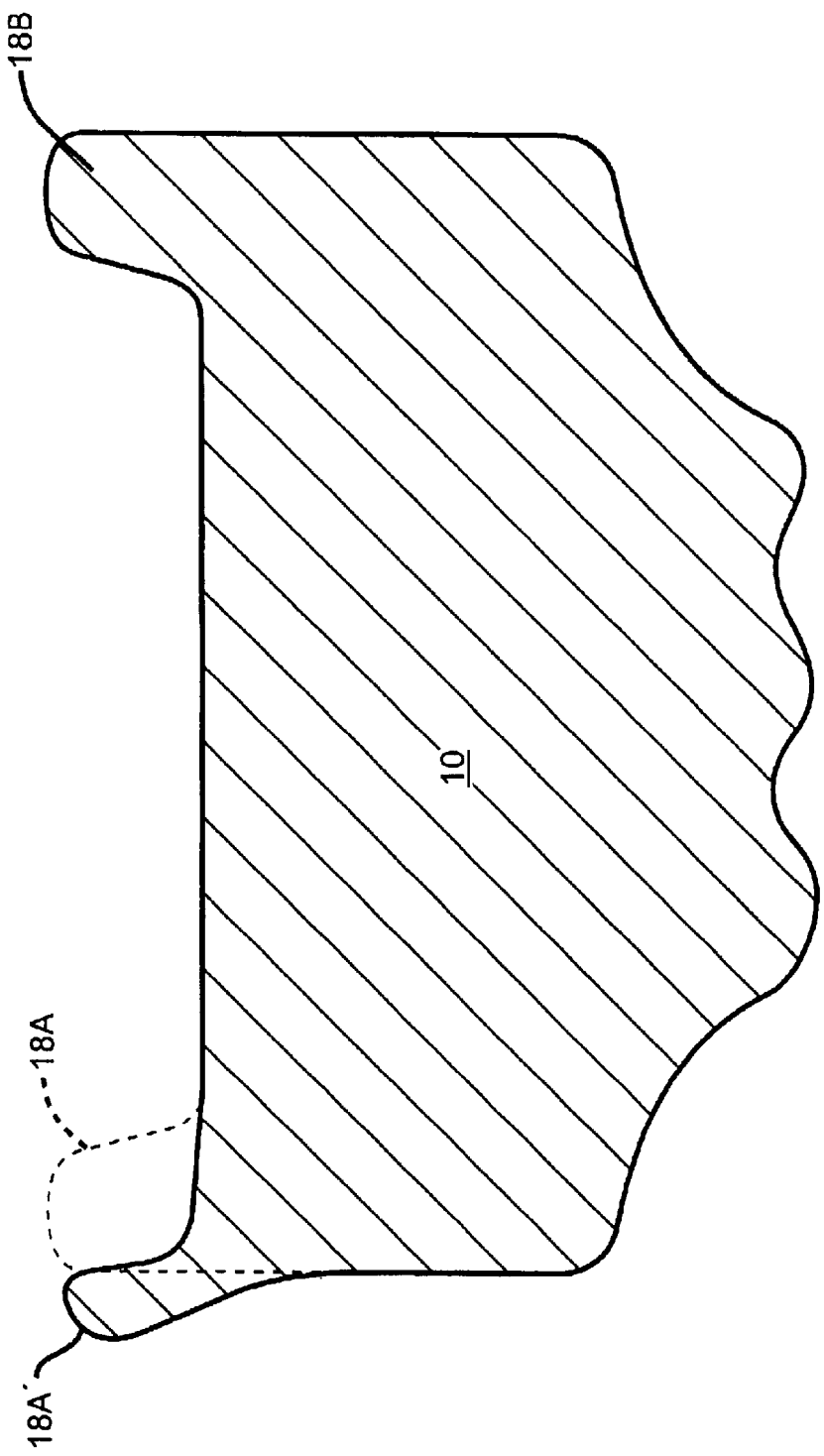
FIG. 4 presents a partial crossectional view of a dual flanged wheel wherein one wheel flange has suffered severe frictional erosion and mutilation from frequent contact with its supporting rail.

FIG. 4 illustrates the actual profile of a dual flanged metal wheel wherein one flange, 18A, experienced excessive wear while its companion flange 18B experienced little or no wear at all. FIG. 4 illustrates a wheel flange 18A, that after having experienced significant frictional erosion and structural mass loss as illustrated in FIG. 3A, became weakened and began to fail by bending outward.

Referring again to FIG. 3, it is desirable to decrease the friction between wheel flange 12 and rail 15 over the area of surface to surface contact 20 between wheel flange 12 and rail side surface 16 without affecting the structural integrity of the basic wheel or decreasing the coefficient of friction of the wheel tread 22.

Figure 5:
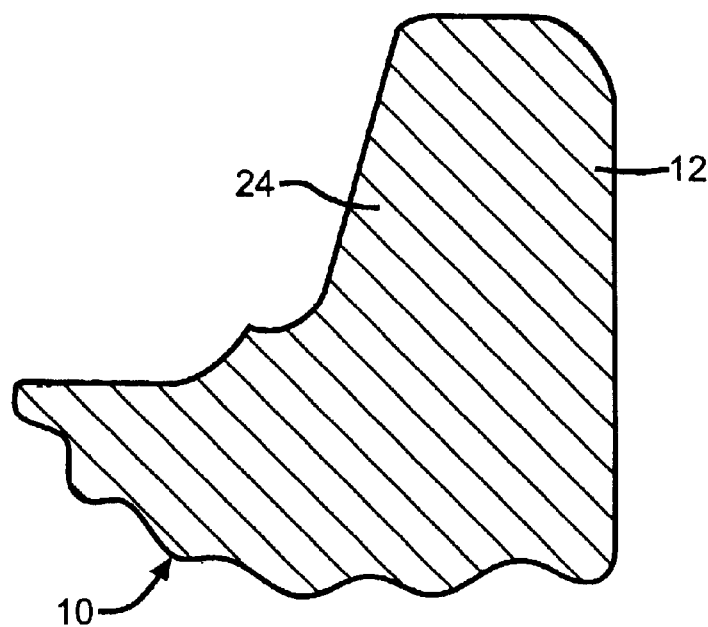
FIG. 5 presents a partial crossectional view of a wheel flange, in accord with the present invention, prior to having an overlay of low friction material applied to the inside surface.
Figure 6:
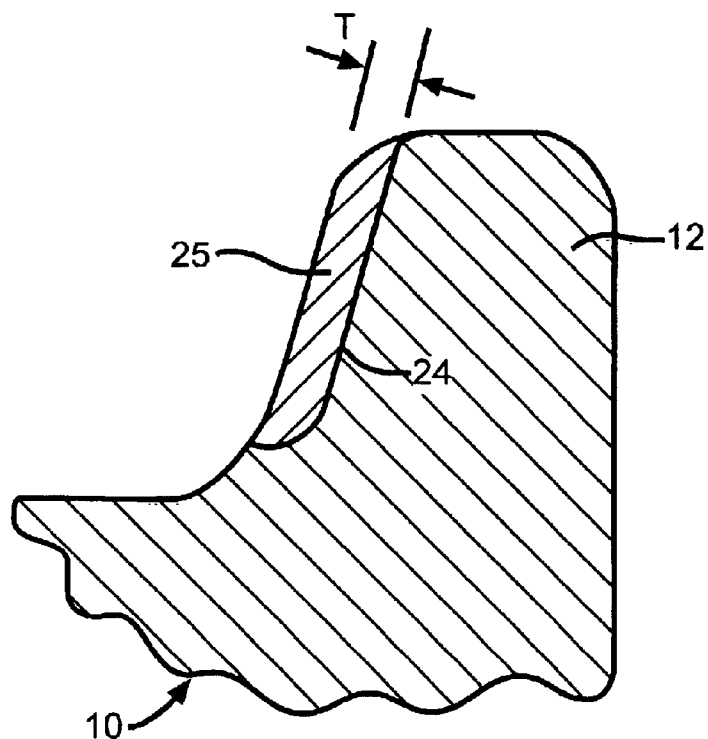
FIG. 6 presents a partial crossectional view of a composite wheel flange in accord with the present invention.

Referring now to FIGS. 5 and 6, a partial crossectional view of a composite wheel flange 12, in accord with the present invention, is illustrated. The basic structure of wheel 10 and flange 12 comprises a heat treated steel suitable for the particular end application of the wheel. However a portion 24 of the inside surface of wheel flange 12, including the area of frictional contact 20 between the wheel flange 12 and the rail 15, as illustrated in FIG. 3, has been machined away. A welded overlay of low friction material 25 is applied to replace the material removed from machined offset 24, on the inside surface of flange 12. Depending upon the intended use and environment within which the composite wheel is expected to operate, suitable overlay materials have been found to comprise a cobalt based alloy or a nickel based alloy. A suitable cobalt based alloy is STELLITE®, or its equivalent, and a suitable nickel based alloy is DELORO®, or its equivalent, as manufactured by Deloro Stellite Company, Inc. of St. Louis, Mo. The overlay thickness T will typically vary depending upon end use application but would not be expected to exceed 50% of the flange 12 thickness.

Although any suitable welding technique, recommended by the weld material manufacturer, may be used to apply the low friction overlay material to the wheel flange, we have found the submerged-arc welding (SAW) process to be particularly suitable. Subsequent to applying the low friction material overlay, the wheel flange is machined to the desired flange profile as illustrated in FIG. 6. Other conceivable methods of applying the low friction overlay 25 may be by adhesive bonding, sintering of powdered metal upon the flange substrate 12, and/or plasma spraying techniques. Subsequent to application of the overlay material 25 upon the flange substrate 12 the final net shape of the flange profile is machined.

The preferred steps in manufacturing a composite steel wheel in accord with the present invention comprises:

1. First a preformed wheel blank is prepared by any known means;
2. The wheel blank is then forged into a desired near net shape wheel blank configuration;
3. The forged near net shaped blank is then machined into its desired final net shape including offset 24 as illustrated in FIG. 5;
4. An overlay of low friction material is applied by any suitable process whereby offset 24 is completely filled with overlay material;
5. The low friction material added to offset 24 is then machined to obtain the desired wheel flange profile as illustrated in FIG. 6;
6. The final machined composite wheel is heat treated by any appropriate and desired heat treatment process.

Alternatively the heat treating step may not be needed for applications that do not require high hardness, but do have need for a composite flange due to frictional erosion with the side of the rail.

The preformed wheel blank, of step 1, may be made by any acceptable manufacturing method consistent with the end use requirements of the wheel being manufactured. For example the preformed blank may be made by a hot isostatic powdered metal process, known metal casting techniques, or cut from rolled or forged bar stock. Also, depending upon end use of the finished wheel and the method of manufacturing the wheel blank, the forging step (step 3) may not be necessary.

The optimum flanged steel wheel manufactured as disclosed herein will have a hardened steel tread surface for contact with the top of the rail including a high degree of traction with the rail surface and adequate core strength to resist vertical loads. The wheel flange, comprising the same basic hardened steel material as the wheel's main body will also exhibit the necessary high strength properties to withstand the side loading resulting from flange rail contact while having a lower coefficient of friction, between flange and rail, because of the low coefficient of friction overlay material. Thus the composite steel wheel structure, as taught herein, allows the flange to withstand the high frictional wear environment and also have the necessary strength to withstand high momentary impact loads resulting from rail engagement.

Although the invention as taught above is primarily directed toward an optimum, high strength, flanged steel wheel, many end uses may not require such an optimum wheel. Nevertheless, the present invention is equally applicable in lesser demanding applications wherein the basic wheel substrate may be manufactured from lower strength cast iron or steel but still have a need for a frictional wear resistant wheel flange surface.

Although a specific embodiment of the invention illustrating a single flanged steel wheel has been principally disclosed herein, there is no intent to hereby limit the invention to the specific embodiment comprising a single flanged wheel. On the contrary, the intention herein is intended to cover all modifications, alternatives, embodiments, usage's, and/or equivalents of the subject invention as may fall within the spirit and scope of the invention as disclosed herein including dual flanged steel wheels.

We claim:

1. A method of producing a composite metal railway wheel for rolling on a metal rail, said wheel having a circumferential tread for rollingly engaging said rail and at least one radially extending side flange for intermittent engagement of the side surface of said rail, comprising the steps of:
    a) providing a preformed wheel blank,
    b) forging said preformed wheel blank into a predetermined near net shape wheel configuration,
    c) machining said near net shaped wheel configuration into a final wheel net shape,
    d) removing a portion of said flange inside surface thereby forming an annular offset circumscribing said flange inside surface, wherein an inner side of said annular offset is spaced radially outward from an intersection of said radially extending side flange and said circumferential tread.
    e) filling said annular offset with an overlay material having a coefficient of friction less than the coefficient of friction of said wheel blank,
    f) machining said overlay material to a predetermined wheel flange profile.

2. The method of producing a composite metal railway wheel as claimed in claim 1 including the step of heat treating said composite wheel.

3. The method of producing a composite metal railway wheel claimed in claim 1 wherein said overlay material applied in (e) comprises a nickel based alloy material.

4. The method of producing a composite metal railway wheel claimed in claim 1 wherein said overlay material applied in (e) comprises a cobalt based alloy material.

5. The method of producing a composite metal railway wheel claimed in claim 1 wherein said overlay material applied in step (e) is applied using a submerged-arc process.

6. The method of producing a composite metal railway wheel claimed in claim 1 wherein said overlay material applied in step (e) is applied using a plasma transfer arc process.

7. A method of producing a composite metal railway wheel for rolling on a metal rail, said wheel having a circumferential tread for rollingly engaging said rail and at least one radially extending side flange for intermittent engagement of the side surface of said rail, comprising the steps of.
    a) providing a preformed wheel blank,
    b) forging said preformed wheel blank into a predetermined near net shape wheel configuration wherein the inside surface of said radially extending side flange includes an annular offset circumscribing said flange inside surface, wherein an inner side of said annular offset is spaced radially outward from an intersection of said radially extending side flange and said circumferential tread,
    c) filling said annular offset with an overlay material having a coefficient of friction less than the coefficient of friction of said wheel blank,
    d) machining said predetermined near net shape wheel configuration, including said overlay material, into a predetermined wheel profile.

8. The method of producing a composite metal railway wheel as claimed in claim 7 including the step of heat treating said composite wheel.

9. The method of producing a composite metal railway wheel claimed in claim 7 wherein said overlay material applied in step (c) comprises a nickel based alloy material.

10. The method of producing a composite metal railway wheel claimed in claim 7 wherein said overlay material applied in step (c) comprises a cobalt based alloy material.

11. The method of producing a composite metal railway wheel claimed in claim 7 wherein said overlay material applied in step (c) is applied using a submerged-arc process.

12. The method of producing a composite metal railway wheel claimed in claim 7 wherein said overlay material applied in step (c) is applied using a plasma transfer arc process.

13. A method of producing a composite metal railway wheel for rolling on a metal rail, said wheel having a circumferential tread for rollingly engaging said rail and at least one radially extending side flange for intermittent engagement of the side surface of said rail, comprising the steps of
    a) providing a near net shape wheel blank wherein the inside surface of said radially extending side flange includes an annular offset circumscribing said flange inside surface, and wherein an inner side of said annular offset is spaced radially outward from an intersection of said radially extending side flange and said circumferential tread,
    b) filling said annular offset with an overlay material having a coefficient of friction less than the coefficient of friction of said wheel blank,
    c) machining said predetermined near net shape wheel blank, including said overlay material, into a predetermined net shape wheel profile.

14. The method of producing a composite metal railway wheel as claimed in claim 13 including the step of heat treating said composite wheel.

15. The method of producing a composite metal railway wheel claimed in claim 13 wherein said overlay material applied in (b) comprises a nickel based alloy material.

16. The method of producing a composite metal railway wheel claimed in claim 13 wherein said overlay material applied in (b) comprises a cobalt based alloy material.

17. The method of producing a composite metal railway wheel claimed in claim 13 wherein said overlay material applied in step (b) is applied using a submerged-arc process.

18. The method of producing a composite metal railway wheel claimed in claim 13 wherein said overlay material applied in step (b) is applied using a plasma transfer arc process.

19. The method of producing a composite metal railway wheel claimed in claim 13 wherein said near net shape wheel blank is made by metal casting techniques.

20. The method of producing a composite metal railway wheel claimed in claim 13 wherein said near net shape wheel blank is made by powdered metal isostatic pressing techniques.

21. The method of claim 13 wherein step (a) includes forging process.

22. A method of producing a composite metal railway wheel for rolling on a metal rail, comprising the steps of:
   a) providing a near net shape wheel blank having a circumferential tread region and a radially extending side flange extending therefrom, the near net shape wheel blank being of unitary construction of a first material, and an inside surface of said radially extending side flange having a continuous offset, wherein an inner side of said continuous offset is spaced radially outward from an intersection of said radially extending side flange and said circumferential tread region, and said circumferential tread region is formed entirely of said first material, b) filling said continuous offset with an overlay material having a coefficient of friction less than a coefficient of friction of said first material, wherein the overlay material is applied using a plasma transfer arc process to bond the overlay material with the first material,
   c) machining at least a portion of said near net shape wheel blank and at least a portion of said overlay material to establish a net shape wheel profile.

23. The method of claim 22 wherein step (a) includes a forging process.

24. A method of producing a composite metal railway wheel for rolling on a metal rail, comprising the steps of:
   a) providing a wheel blank having a circumferential tread region and a radially extending side flange extending therefrom, the wheel blank being of unitary construction of a first material, and an inside surface of said radially extending side flange having a continuous offset extending therearound, wherein an inner side of said continuous offset is spaced radially outward from an intersection of said radially extending side flange and said circumferential tread region,
   b) filling said annular offset with an overlay material having a coefficient of friction less than a coefficient of friction of said first material, wherein the overlay material is applied using a plasma transfer arc process to bond the overlay material with the first material,
   c) working the wheel blank and the overlay material to establish a net shape wheel profile.

25. The method of claim 24 wherein step (a) includes a forging process.

* * * * *

UNITED STATES PATENT AND TRADEMARK OFFICE
CERTIFICATE OF CORRECTION

PATENT NO. : 6,746,064 B1  
DATED : June 8, 2004  
INVENTOR(S) : Frank P. Petrek et al.

It is certified that error appears in the above-identified patent and that said Letters Patent is hereby corrected as shown below:

Column 6,
Line 3, change the word "are" to -- arc --.
Line 10, change the "." at the end of the line with -- ; --.
Line 48, insert -- ; -- at the end of the line.

Column 7,
Line 19, insert -- a -- before "forging".
Line 32, subparagraph "b)" should begin a new line.

Signed and Sealed this

Thirtieth Day of November, 2004

JON W. DUDAS
*Director of the United States Patent and Trademark Office*